United States Patent [19]

House

[11] 4,269,279

[45] May 26, 1981

[54] SPHEROIDAL PLASTIC COATED MAGNETIZABLE PARTICLES AND THEIR USE IN DRILLING FLUIDS

[75] Inventor: Roy F. House, Houston, Tex.

[73] Assignee: NL Industries, Inc., New York, N.Y.

[21] Appl. No.: 111,681

[22] Filed: Jan. 14, 1980

[51] Int. Cl.³ .......................... E21B 3/00; E21B 7/00
[52] U.S. Cl. ...................................... 175/66; 175/65; 252/8.5 A
[58] Field of Search ............... 175/65, 66; 252/8.5 A, 252/8.5 R

[56] References Cited

U.S. PATENT DOCUMENTS

| | | | |
|---|---|---|---|
| 3,186,812 | 6/1965 | Pfaender | 175/65 X |
| 4,063,603 | 12/1977 | Rayborn | 252/8.5 R X |
| 4,123,367 | 10/1978 | Dodd | 175/65 X |

FOREIGN PATENT DOCUMENTS 578320 10/1977 U.S.S.R. ............... 252/8.5 A

Primary Examiner—James A. Leppink
Assistant Examiner—George A. Suchfield
Attorney, Agent, or Firm—Browning, Bushman & Zamecki

[57] ABSTRACT

Plastic coated magnetic particles in bead form are used in drilling fluids to increase the lubricity thereof as indicated by a decrease in the drilling torque or the power required to rotate the drill string. Also provided is a method of recovering the beads from the drilling fluid for re-use using a magnetic separator.

12 Claims, No Drawings

SPHEROIDAL PLASTIC COATED MAGNETIZABLE PARTICLES AND THEIR USE IN DRILLING FLUIDS

This invention relates to drilling fluids and drilling processes and to novel spheroidal lubricants for use therein. It is particularly concerned with drilling fluids having improved lubricating characteristics under low-load, non-extreme pressure conditions as evidenced by a reduction in the power required to rotate the drill pipe, a reduction in the drag of the drill pipe which occurs during vertical movement into and out of the borehole, a reduction in the tendency of the pipe to become stuck, or a reduction in the drilling torque.

Rayborn U.S. Pat. No. 4,063,603 discloses the use of plastic beads or spheres to increase the lubricity of drilling fluids. Dodd U.S. Pat. No. 4,123,367 reviews the prior art and discloses the use of non-softening minute solid glass spheres (beads) to increase the lubricity of drilling fluids. These patents are incorporated herein by reference to provide a background for the invention. According to U.S. Pat. No. 4,063,603, in order to be useful in drilling fluids the maximum size of the bead should be such that the plastic beads will pass through the shale shaker being used in the drilling process. This necessarily limits the size of the plastic spheres or limits the size of the screen used in the shale shaker. In the former case larger beads may be desired but cannot be used, whereas in the latter case the screen size may be so large that it does not remove all of the cuttings. In the case where the plastic beads are larger than the screen size on the shale shaker, there is in use an elaborate system of shaker screens and an agitated tank to separate the beads from the cuttings for re-use in the drilling fluid. The very fine particle size of the glass micro spheres disclosed in the U.S. Pat. No. 4,123,367 is too small under certain drilling conditions to effectively increase the lubricity of the drilling fluid.

Accordingly, there is a need for a solid spheroidal (bead) lubricating additive which can be added to a drilling fluid in any desired particle size range and which can be easily removed from the drilling fluid and easily separated from the cuttings in the drilling fluid.

I have now found that plastic beads having a core of a magnetizable particle can be added to a drilling fluid to reduce the friction which occurs between the drill string and the sides of the borehole during a drilling operation. There is no size limitation for the beads as they are easily removed from the drilling fluid by magnetic means. Thus they can be used in another well or re-circulated with the drilling fluid after mechanically treating it to remove the drilled cuttings.

Thus in practicing my invention, the drill string is rotated in a conventional manner to form a borehole in the earth, concurrently a drilling fluid is circulated in a conventional manner down the inside of the drill string and up the annulus between the drilling string and the sides of the borehole being drilled, and when the power required to rotate the drill string becomes undesirably high there is added to the drilling fluid plastic beads having a core of a magnetizable particle in an amount sufficient to reduce the power required to rotate the drill string. Normally a minimum concentration of 4 ppb (pounds of spheres per 42 gallon barrel of drilling fluid) will be required to reduce the power requirement, and generally larger amounts may be added to reduce the power requirement to the minimum possible value. A concentration of 10 ppb should be very effective under most drilling conditions.

In accordance with another embodiment of my invention, the drilling fluid containing the spheres is treated after emergence of the drilling fluid from the borehole to remove the cuttings and spheres from the drilling fluid. Thereafter the spheres are separated from the cuttings and added back to the drilling fluid for re-circulation in the boreholes. In this instance the maximum desired concentration of spheres in the drilling fluid can be maintained since the only spheres lost in the drilling process are those spheres which become imbedded in the filter cake on the sides of the borehole.

Preferably the spheres and cuttings are removed from the drilling fluid by either of two processes. In one process the drilling fluid upon emerging from the flow-line is caused to flow across a magnetized surface whereby the spheres are attracted to and held by the magnetized surface and the drilling fluid and cuttings are separated therefrom. After removing the cuttings from the drilling fluid by any conventional means, such as with a shale shaker, the spheres are added to the cuttings-free drilling fluid for re-circulation into the wellbore.

Alternatively, the drilling fluid upon emergence from the flow line is passed across a shale shaker to remove the cuttings and larger spheres from the drilling fluid. Thereafter the cuttings and spheres are passed over a magnetized surface whereby the spheres are separated from the cuttings. The spheres are then added to the cuttings-free drilling fluid for re-circulation into the borehole. This is the preferred method of treating the drilling fluid in order to re-circulate the spheres.

Magnetic separators and magnetic separation processes are well-known in the mineral dressing field. See for example the section entitled "Magnetic Separation," Kirk-Othmer Encyclopedia of Chemical Technology, Second Edition, Vol. 12, pp. 782–800.

The magnetizable material within the plastic spheres may be any finely particulate ferromagnetic material. Preferably the magnetizable material will have an average particle size of 44 microns or less, most preferable less than about 10 microns. Suitable ferromagnetic materials include magnetite, franklinite, iron and certain alloys of iron. A magnetized magnetite prepared according to the teachings of U.S. Pat. No. 3,784,898 is conveniently utilized as the core material.

The plastic beads are preferably prepared using a suspension polymerization process in which the core particulate material is first suspended in the aqueous phase. There is preferably added to the suspension an additive to promote the wetting of the particulate material by the monomeric material. Suitable additives are fatty acids, lecithin, waxes, vegetable oils and the like. Thereafter the monomer or monomer mixture containing from about 0.3% to 1.5% initiator, usually benzoyl peroxide, is added and the mixture agitated to disperse the monomer liquid in globules about the particulate materials, generally a small amount, up to about 2%, of a suspending agent is added to prevent agglomeration of the spheres. Typical suspending agents are non-ionic hydrophilic polymers such as gelatin, starch and starch ether deriviaties such as hydroxyethyl starch, cellulose ether derivatives such as hydroxyethyl cellulose, methylcellulose, and hydroxyethyl methyl cellulose, poly (vinyl alcohol), and the like. The polymerization is conducted with agitation at temperatures from about 70° C. to reflux for periods ranging from about 3 to about 12 hours.

The designation "core" is used herein to signify that the particulate magnetizable material is encapsulated with the desired plastic and is not intended to mean that the magnetizable particle is centrally located within the plastic bead.

The monomers chosen to prepare the beads must produce a plastic which is insoluble in water and hydrocarbons, which has a softening point above any temperatures expected to be encountered during the drilling operation, and which is sufficiently strong and resilient that no substantial crushing of the beads occurs during the drilling operation. The preferred monomers are styrene and divinylbenzene. Polystyrene crosslinked with from about 2% to about 20% divinylbenzene produces a bead which has a very high softening point, above about 350° F. The density and cost of the beads increases as the concentration of crosslinking monomer increases. Thus it is preferred to incorporate from about 4% to about 10% of divinylbenzene into the polymer.

A particularly useful monomer mixture consists of from about 80% to about 94% styrene, 2% to about 12% ethylvinyl benzene, and 4% to about 10% divinylbenzene.

The following examples will further illustrate the invention and are not intended to limit the invention. Obvious changes may be made by those skilled in the art without changing the essential characteristics of the inventions. All percentages are expressed as % by weight unless stated otherwise.

EXAMPLE 1

Plastic beads having a core of magnetizable material are prepared. Iron having a particle size less than 325 mesh (44 microns) is suspended in water with vigorous agitation at a concentration of 2%. To this is added 403%, based on the weight of iron, of a monomer mixture containing 86.02% styrene, 7.94% divinylbenzene, 5.29% ethylvinyl benzene, and 0.75% benzoyl peroxide initiator followed by 5%, based on the weight of iron, of stearic acid and 1% NATROSOL 250 HHR hydroxyethyl cellulose. The mixture is vigorously agitated to suspend the droplets. The mixture is heated to reflux and held at temperature for 5 hours. Thereafter the mixture is cooled, filtered and the beads washed with water and dried at 150° F.

EXAMPLE 2

Magnetite, $Fe_3O_4$, having an average particle size of 0.4 microns, is mixed with 404%, based on the weight of magnetite, of a monomer mixture containing 91.09% styrene, 3.97% divinylbenzene, 3.97% ethylvinyl benzene, and 0.97% benzoyl peroxide initiator, and 3.5%, based on the weight of iron, of lecithin. This mixture is suspended at a concentration of 10% in water having dispersed therein 0.75% hydroxyethyl cellulose. The mixture is heated to reflux and held for 5 hours, filtered and the beads washed with water and dried at 150° F.

EXAMPLE 3

Magnetite having an average particle size of 5 microns is suspended in water with vigorous agitation at a concentration of 2%. To this is added: 50%, based on the weight of magnetite, of soybean oil; 453.4%, based on the weight of magnetite, of a monomer mixture containing 83.16% styrene, 3.96% divinylbenzene, 11.88% ethylvinyl benzene, and 1.00% benzoyl peroxide initiator; and 0.75% hydroxyethyl cellulose. The mixture is heated to reflux and held at temperature for 4 hours, filtered, and the beads washed and dried at 150° F.

EXAMPLE 4

Iron having a particle size less than 325 mesh is suspended at 2% concentration in water with vigorous agitation and heated to 180° F. To this is added 50%, based on the weight of iron, of a paraffin wax which had been heated above its melting point of about 70° C. The mixture is cooled to room temperature while maintaining the agitation. To this suspension is added 352.6%, based on the weight of iron, of a monomer mixture containing 83.37% styrene, 7.94% divinylbenzene, 7.94% ethylvinyl benzene, and 0.75% benzoyl peroxide, and 2% polyvinyl alcohol. The mixture is heated to reflux and held at temperature for 6 hours, cooled, filtered, and the beads washed with water and dried at 150° F.

EXAMPLE 5

The beads from Examples 1–4 are dispersed in a freshwater bentonite mud and a potassium chloride—DEXTRID stabilized starch—DRISPAC polyanionic cellulose drilling fluid at a concentration of 4 ppb and 10 ppb. The drilling fluids are tested in a laboratory drilling machine using Berea sandstone cores as the specimens drilled. A reduction in the drilling torque of these drilling fluids is observed in the range from 15%–25% at 4 ppb and 23%–44% at 10 ppb. The beads are removed from the drilling fluids upon stirring with a magnet.

EXAMPLE 6

The drilling fluids from Example 5 are mixed with 10 ppb of a sand having a particle size in the range from 10 to 100 mesh. The contaminated drilling fluids are then passed over a 100 mesh screen to remove the sand and the plastic beads larger than 100 mesh. The beads are then separated from the sand with a magnet and re-added to the drilling fluid. A complete separation of the beads from the sand is obtained.

I claim:

1. In a method of drilling a well wherein a drill string is rotated to drill a borehole into the earth and a drilling fluid is circulated down through the drill string and the sides of the borehole to remove the cuttings therefrom, said drilling fluid containing a solid bead lubricant to reduce the friction between the drill string and the sides of the borehole, the improvement which comprises utilizing as said solid bead lubricant smooth-surface plastic spheres having a core of a magnetizable material.

2. The method of claim 1 wherein said spheres are made of a plastic material which is insoluble in hydrocarbons and water, which has a softening point above any temperature expected to be encountered during the drilling operation, and which is sufficiently strong and resilient that no substantial crushing of the beads occurs during the drilling operation.

3. The method of claim 2 wherein said plastic material is a copolymer of styrene and a divinyl aromatic crosslinking agent.

4. The method of claim 3 wherein said crosslinking agent is divinylbenzene.

5. The method of claim 2 wherein said magnetizable material is selected from the group consisting of magnetite, iron, magnetic alloys containing iron, and mixtures thereof.

6. The method of claim 5 wherein said plastic material is obtained from a monomeric mixture consisting of from about 80% to about 94% styrene, 2% to about 12% ethylvinyl benzene, and 4% to about 10% divinylbenzene.

7. The method of claim 6 wherein said drilling fluid contains at least 4 pounds of said beads per 42 gallon barrel of said drilling fluid.

8. The method of claim 6 comprising passing said drilling fluid containing said spheres after emergence from said borehole through a magnetic separator to remove said spheres from said drilling fluid.

9. The method of claim 6 comprising separating said drilling fluid containing said spheres after emergence from said borehole into a liquid drilling fluid fraction and a solid fraction, said solid fraction containing said spheres and drilled cuttings from the well, separating by magnetic means said spheres from said cuttings, and returning said spheres to said liquid drilling fluid fraction.

10. The method of claim 1 wherein said drilling fluid contains at least 4 pounds of said beads per 42 gallon barrel of said drilling fluid.

11. The method of claim 1 comprising passing said drilling fluid containing said spheres after emergence from said borehole through a magnetic separator to remove said spheres from said drilling fluid.

12. The method of claim 1 comprising separating said drilling fluid containing said spheres after emergence from said borehole into a liquid drilling fluid fraction and a solid, fraction, said solid fraction containing said spheres and drilling cuttings from the well, separated by magnetic means said spheres from said cuttings in said solid fraction, and returning said spheres to said liquid drilling fluid fraction.

* * * * *